United States Patent
Kurokawa (10) Patent No.: US 8,502,999 B2
(45) Date of Patent: Aug. 6, 2013

(54) IMAGE FORMING APPARATUS

(75) Inventor: Kotaro Kurokawa, Aichi (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 72 days.

(21) Appl. No.: 13/279,610

(22) Filed: Oct. 24, 2011

(65) Prior Publication Data

US 2012/0099132 A1    Apr. 26, 2012

(30) Foreign Application Priority Data

Oct. 25, 2010  (JP) .................................. 2010-238604

(51) Int. Cl.
 *G06K 15/02*  (2006.01)

(52) U.S. Cl.
 USPC ......... 358/1.13; 358/1.14; 358/1.15; 358/1.2; 399/395; 399/405

(58) Field of Classification Search
 USPC ............... 358/1.13, 1.14, 1.15, 1.2; 399/395, 399/405
 See application file for complete search history.

(56) References Cited

U.S. PATENT DOCUMENTS

| | | | |
|---|---|---|---|
| 6,154,286 A * | 11/2000 | Konno et al. ................ | 358/1.13 |
| 6,725,001 B2 | 4/2004 | Takahashi et al. | |
| 6,954,610 B2 | 10/2005 | Yamada et al. | |
| 7,416,178 B2 | 8/2008 | Ito | |
| 7,489,886 B2 | 2/2009 | Ito | |
| 8,174,736 B2 | 5/2012 | Ito | |
| 8,289,567 B2 * | 10/2012 | Ouchi ............................ | 358/1.2 |
| 2003/0012579 A1 | 1/2003 | Takahashi et al. | |
| 2004/0071485 A1 | 4/2004 | Yamada et al. | |
| 2005/0281597 A1 | 12/2005 | Ito | |
| 2007/0071492 A1 | 3/2007 | Ito | |
| 2009/0059317 A1 | 3/2009 | Ito | |
| 2009/0238623 A1 * | 9/2009 | Kobayashi .................... | 399/405 |

FOREIGN PATENT DOCUMENTS

| | | |
|---|---|---|
| JP | 05-199340 A | 8/1993 |
| JP | 08-334944 | 12/1996 |
| JP | 2001-318496 A | 11/2001 |
| JP | 2003-019846 A | 1/2003 |
| JP | 2004-138683 A | 5/2004 |
| JP | 2005-173172 A | 6/2005 |
| JP | 2006-001141 | 1/2006 |
| JP | 2006-239876 A | 9/2006 |
| JP | 2007-083672 A | 4/2007 |
| JP | 2009-065358 A | 3/2009 |

* cited by examiner

OTHER PUBLICATIONS

Notification of Reasons for Rejection issued in Japanese Patent Application No. 2010-238604 mailed Jan. 22, 2013.

*Primary Examiner* — King Poon
*Assistant Examiner* — Allen H Nguyen
(74) *Attorney, Agent, or Firm* — Banner & Witcoff, Ltd.

(57) ABSTRACT

An image forming apparatus to form an image on a recording medium is provided. The image forming apparatus includes a housing, an image forming unit, an image reader unit, an ejecting space to catch the recording medium, a pickup opening to expose the ejecting space, and a frame assembly to hold the image forming unit and the image reader unit. The housing includes an operation unit, which is configured to form an upper edge of the pickup opening. An enhancement member extending along a widthwise direction to bridge over the ejecting space is arranged in a lower position in the operation unit. The frame assembly includes a first support member and a second support member, which are arranged in widthwise ends of the ejecting space. The enhancement member is connected to the first support member and to the second support member at the widthwise ends thereof.

5 Claims, 8 Drawing Sheets

IMAGE FORMING APPARATUS

CROSS REFERENCE TO RELATED APPLICATION

This application claims priority from Japanese Patent Application No. 2010-238604, filed on Oct. 25, 2010, the entire subject matter of which is incorporated herein by reference.

BACKGROUND

1. Technical Field

An aspect of the present invention relates to an image forming apparatus.

2. Related Art

An image forming apparatus, which has a housing being an external covering, an image forming unit to form an image on a recording medium, and an image reader unit to read an image formed on an original document, is known. The image forming unit may be stored in a lower position inside the housing, and the image reader unit may be installed in an upper position inside the housing. Further, the image forming apparatus may be formed to have an ejecting space, in which the recording medium with the image formed thereon is ejected, in a position between the image forming unit and the image reader unit, and an opening, through which a user can access the ejecting space to pick up the recording medium ejected therein, on a front side of the housing.

Further, the image forming apparatus may have an operation unit, through which the user enters information and instructions for the image forming unit and the image reader unit, arranged on the housing. The operation unit often includes an electric circuit board and may be arranged in an upper position with respect to the ejecting space to form an upper edge of the opening.

With the ejecting space to catch the ejected recording medium, in order for the user to reach and pick up a smaller-sized recording medium from the ejecting space easily, the housing may be configured to have an upper section, which includes a ceiling plane of the ejection space and the upper edge of the opening above the ejecting space, to be vertically swingable. When the ceiling section with the upper edge of the opening swings, the ejecting space may be more largely exposed, and the user may access the ejected recording medium easily.

SUMMARY

Meanwhile, when the image forming apparatus is carried to be moved to a different location, the user may try to uplift the image forming apparatus by the ceiling section of the housing with his/her hands gripping onto the upper edge of the opening. In so doing, the operation unit in the vicinity of the upper edge of the opening may be touched or pressed hard by the hands of the user as the user tries to lift the substantially-weighing image forming apparatus upward. Accordingly, the electric circuit board in the operation unit may be deformed or damaged by the pressure, and malfunction of the operation unit may be caused.

In view of the above deficiency, the present invention is advantageous in providing an image forming apparatus, in which malfunction of the operation unit can be prevented.

According to an aspect of the present invention, an image forming apparatus is provided. The image forming apparatus includes a housing, which is configured to form an external shape of the image forming apparatus, an image forming unit, which is stored inside the housing and configured to form an image on a recording medium, an image reader unit, which is stored inside the housing with respect to the image forming unit and configured to read an image formed on an original document, an ejecting space, which is formed in the housing and configured to catch the recording medium with the image formed thereon being ejected, a pickup opening, which is formed on a side of the housing to expose the ejecting space, and through which the recording medium caught in the ejecting space is picked up, and a frame assembly, which is arranged inside the housing and configured to hold the image forming unit and the image reader unit. The housing includes an operation unit, which is arranged in an upper position with respect to the ejecting space and configured to form an upper edge of the pickup opening, and through which input information concerning behaviors of the image forming unit and the image reader unit is entered, the operation unit including an electric circuit board. An enhancement member, which extends along a widthwise direction to bridge over the ejecting space, is arranged in a lower position in the operation unit with respect to the electric circuit board, the widthwise direction being in parallel with the upper edge. The frame assembly includes a first support member, which is arranged in one of widthwise ends of the ejecting space, and a second support member, which is arranged in the other of widthwise ends of the ejecting space. One of widthwise ends of the enhancement member is connected to the first support member, and the other of the widthwise ends of the enhancement member is connected to the second support member.

DETAILED DESCRIPTION

Hereinafter, an embodiment according to an aspect of the present invention will be described with reference to the accompanying drawings. An image forming apparatus 1 is a multifunction peripheral printer, which is capable of printing and reading images. In the present embodiment described below, directions concerning the image forming apparatus 1 will be referred to based on a user's position to ordinarily use the image forming apparatus 1 and in accordance with orientation indicated by arrows shown in FIG. 1. That is, a viewer's nearer right-hand side appearing in FIG. 1, on which an operation unit 50 is arranged, is referred to as a front face of the image forming apparatus 1. A further left-hand side in FIG. 1 opposite from the front is referred to as rear. The front-rear direction of the image forming apparatus 1 may also be referred to as a direction of depth. A side, which corresponds to the viewer's nearer left-hand side is referred to as a left-side face, and an opposite side from the left, which corresponds to the viewer's further right-hand side, is referred to as a right-side face. The right-left direction of the image forming apparatus 1 may also be referred to as a widthwise direction. The up-down direction in FIG. 1 corresponds to a vertical direction of the image forming apparatus.

Overall Configuration

Figure 1:
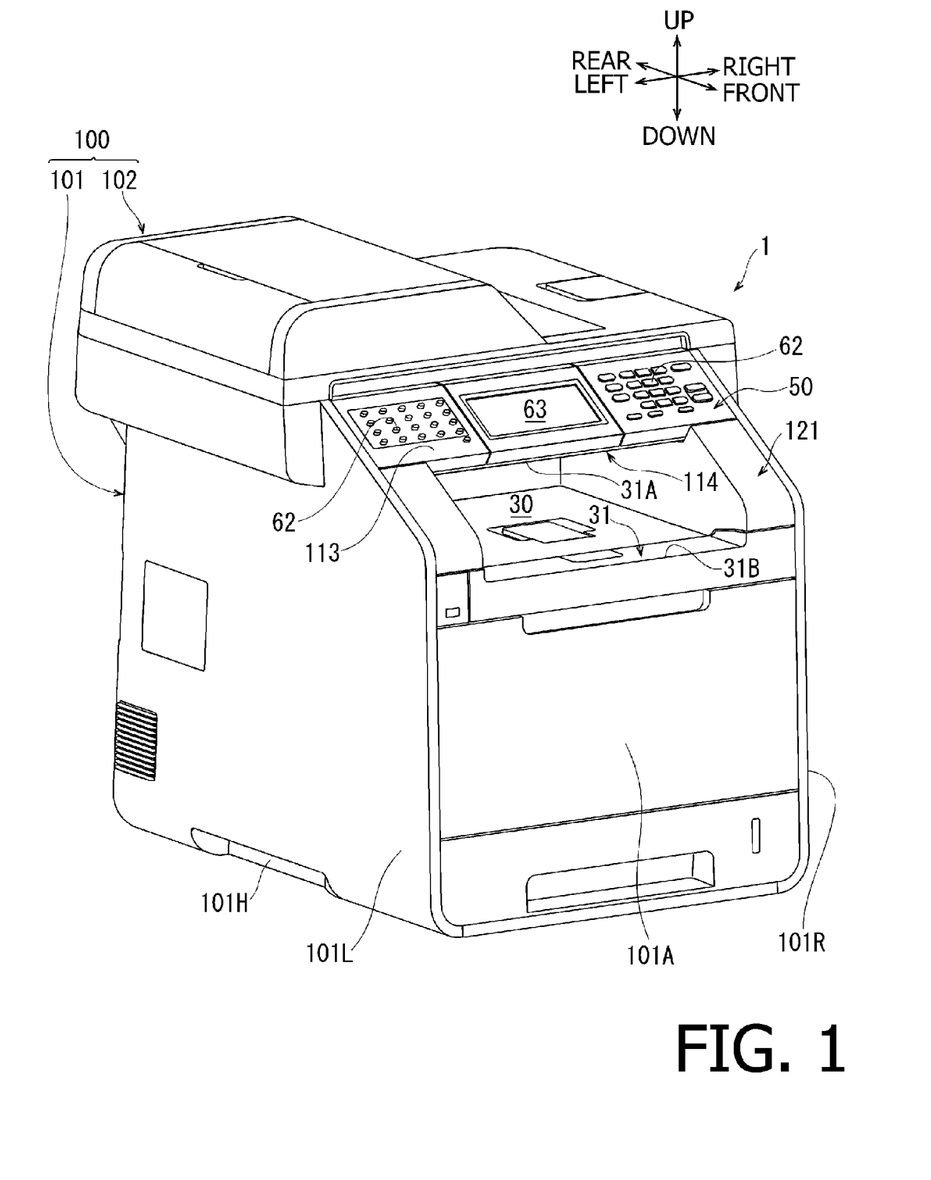
FIG. 1 is a perspective view of an image forming apparatus according to an embodiment of the present invention.
Figure 2:
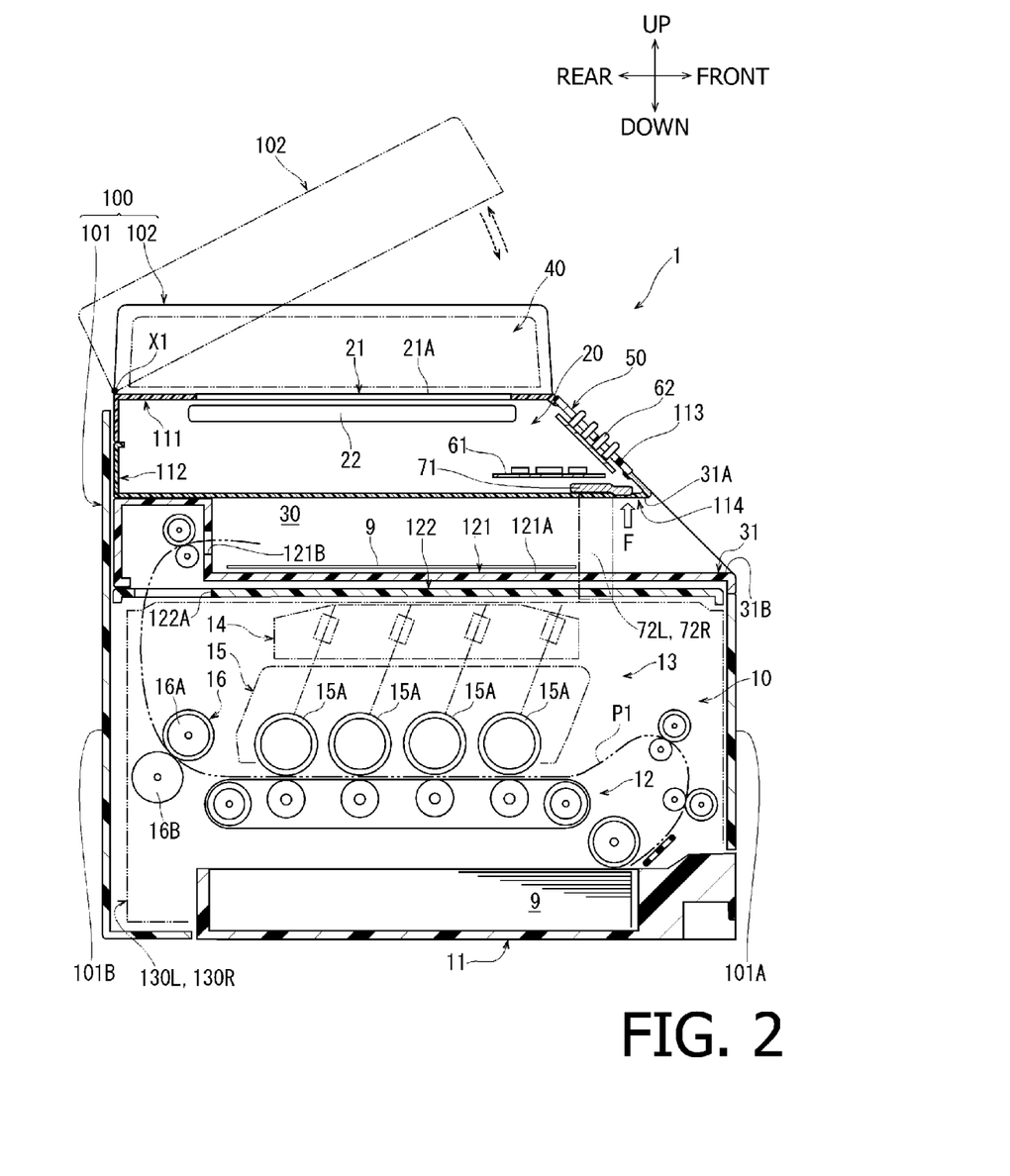
FIG. 2 is a cross-sectional side view of the image forming apparatus according to the embodiment of the present invention.

As shown in FIGS. 1 and 2, the image forming apparatus 1 has a housing 100, which forms an external shape of the image forming apparatus 1. The housing 100 includes a main housing 101 and an openable housing 102 arranged on top of the main housing 101.

The image forming apparatus 1 includes an image printer unit 10, which forms an image on a recording medium 9 (e.g., a sheet of paper, an OHP sheet, etc.). The image printer unit 10 is arranged in a lower section inside the main housing 101 (see FIG. 2). Further, the image forming apparatus 1 includes an image reader unit 20, which reads an image formed on an original document. The image reader unit 20 is arranged in an upper section inside the main housing 101.

The image forming apparatus 1 has an ejecting space 30, in which the recording medium 9 with the image formed thereon is ejected, in a position between the image printer unit 10 and the image reader unit 20 within the main housing 101. Moreover, the image forming apparatus 1 has a pickup opening, which connects the ejecting space 30 to the atmosphere, and through which the user can access the ejecting space 30 to pick up the recording medium 9 caught therein. The ejecting space 30 is formed have a sufficient width and a depth to accept the ejected recording media in various sizes. Further, the ejecting space 30 is formed to have a sufficient height to allow the user's hand to reach the recording medium disposed in a rear area of the ejecting space 30, and the pickup opening 31 is formed to have an upper edge 31A thereof in a rearward position with respect to a lower edge 31B. The upper edge 31A of the pickup opening 31 extends in parallel with the left-right direction, i.e., along the widthwise direction.

The operation unit 50 (see FIGS. 1 and 2) is arranged on the front face of the main housing 101 in an upper position with respect to the ejecting space 30 to define the upper edge 31A of the pickup opening 31. More specifically, a lower edge of the operation unit 50 coincides with the upper edge 31A of the pickup opening 31. The operation unit 50 includes an electric circuit board 61, which has electric components (unsigned) and wires (not shown). The operation unit 50 further includes keys 62 and a display 63, which are connected to the electric circuit board 61 via the wires. The operation unit 50 serves as an interface, through which input information concerning behaviors of the image printer unit 10 and the image reader unit 20 is entered by the user via the keys 62. Further, through the operation unit 50, output information concerning settings and behaviors of the image printer unit 10 and the image reader unit 20 is output via the display 63. The configuration of the operation unit 50 will be described ate in detail.

The openable housing 102 is attached to the main housing 101 to be swingable about a swing axis X1 (see FIG. 2), which extends along an upper rear edge of the main housing 101 in parallel with the widthwise direction. The openable housing 102 may be in a horizontal closed position normally, as indicated by solid lines in FIG. 2, to cover a flatbed surface 21A being a top surface of the main housing 101. When the user uplifts a front side of the openable housing 102 to rotate the openable housing 102 about the swing axis X1, the openable housing 102 is placed in an open position, as indicated in double-dotted line in FIG. 2, to expose the flatbed surface 21A of the main housing 101. When the flatbed surface 21A is exposed, the user may set an original document with an image to be read on the flatbed surface 21A.

Inside the openable housing 102, a known auto document feeder (ADF) 40, which automatically feeds one or more sheets of the original document to the flatbed surface 21A, is stored. Detailed description of the ADF 40 will be herein omitted.

Image Printer Unit

The image printer unit 10 according to the present embodiment is in a known printing device. The image printer unit 10 includes a sheet cassette 11 to contain the recording medium 9, a conveyer 12 to pick up the recording medium 9 from the sheet cassette 11 and convey the picked-up recording medium 9 along a conveyer path P1 to the ejecting space 30. Further, the image printer unit 10 includes an image forming unit 13, which is arranged in an upper position with respect to the sheet cassette 11 and a lower position with respect to the ejecting space 30.

The conveyer path P1 to direct the recording medium 9 is formed to extend upwardly from an upper front section of the sheet cassette 11 and is curved rearward to extend horizontally in a position below the image forming unit 13. Further, the conveyer path P1 is curved upwardly at a rear end section in the main casing 100 and then frontward to direct the recording medium 9 to the ejecting space 30.

The image forming unit 13 is a direct-tandem color printing unit having a developer toner cartridge 15, a scanner 14, and a fixing unit 16. The developer toner cartridge 15 includes four cartridges, which are arranged in line in the direction of depth along the horizontal section of the conveyer path P1. Each of the four cartridges contains toner of one of four different colors (e.g., black, yellow, magenta, and cyan). The developer toner cartridge 15 includes photosensitive drums 15A, developer rollers (not shown), chargers (not shown), and toner containers (not shown) for the four cartridges. The scanner 14 includes laser light sources, polygon mirrors, fθ lenses, and reflection mirrors, which are not shown. Laser beams are emitted from the laser light sources, and peripheral surfaces of the photosensitive drums 15A in the developer toner cartridge 15 are exposed to the laser beams to form latent images on the peripheral surfaces. The fixing unit 16 heats the recording medium 9, which passed through the horizontal section of the conveyer path P1 below the developer toner cartridge 15, via a heat roller 16A and applies pressure to the recording medium 9 via a pressure roller 16B.

When an image is formed in the image forming unit 13, the peripheral surfaces of the photosensitive drums 15A are positively charged evenly by the chargers as the photosensitive drums 15A rotate. The positively-charged photosensitive drums 15A are exposed to the laser beams emitted from the scanner 14 according to the image to be formed. Thus, the areas exposed to the laser beams form latent images on the peripheral surfaces of the photosensitive drums 15A. Thereafter, toners are supplied from the toner containers to the latent images to develop toner images on the peripheral surfaces of the photosensitive drums 15A. The developed toner images are transferred onto the surface of the recording medium 9 when the recording medium is conveyed in the horizontal section of the conveyer path P1. The transferred toner images are heated and pressed in the fixing unit 16 and fixed on the recording medium 9. Thus, the image is formed on the surface of the recording medium 9.

The recording medium 9 with the fixed image is ejected and caught in the ejecting space 30, and the user may insert his/her hand in the ejecting space 30 through the pickup opening 31 to pick up the recording medium 9. As mentioned above, the pickup opening 31 and the ejecting space 30 are formed to have shapes to allow the user to easily access the rear area in the ejecting space 30. Therefore, the recording media 9 of various sizes, from a smaller size to a larger size, can be easily reached to be picked up by the user. Accordingly, it is not necessary that the ceiling section with the upper edge 31A of the pickup opening 31 above the ejecting space 30 is upwardly swingable to largely expose the ejecting space 30.

Image Reader Unit

The image reader unit 20 is a flatbed image reading device, which is arranged in the upper section in the main housing 101. A top surface of the main housing 101 is formed to have an opening, which is covered by a piece of platen glass 21. The top surface of the main housing 101 coincides with the flatbed surface 21A, on which the original document with the image to be read is placed.

In the image reader unit 20, an image reader 22 is stored in a lower position with respect to the platen glass 21. The image reader 22 may be an image readable sensor such as, for example, a contact image sensor (CIS) and a charge coupled device (CCD). The image reader 22 is movable in the widthwise direction of the image forming apparatus 1 by a slider mechanism (not shown).

When the openable housing 102 is rotated to the open position, and when the original document is placed on the flatbed surface 21A, the image reader 22 reads the image appearing on the original document sequentially in lines, which are in parallel with the front-rear direction, while the image reader 22 is moved in the direction of width in a readable range underneath the platen glass 21. According to the present embodiment, the direction of the lines in parallel with the front-rear direction (i.e., the direction of depth) is a main scanning direction, and the direction of the image reader 22 to be moved (i.e., the widthwise direction) is the auxiliary scanning direction. When the image reader 22 is moved from one end to the other end of the readable range along the auxiliary scanning direction, the entire image on the original document is read. When the original document includes a plurality of sheets, the sheets may be set in the ADF 40 to be fed automatically one-by-one in the image reader unit 20. The plurality of sheets are conveyed over the image reader 22, which is fixed in a predetermined reading position, to have the images appearing on the plurality of sheets scanned and read by the image reader 22.

Main Housing

The main housing 101 will be described below in detail. The main housing 101 includes a front cover 101A, lateral covers 101L, 101R, and a rear cover 101B being external coverings (see FIGS. 1 and 2). The front cover 101A, the lateral covers 101L, 101R, and the rear cover 101B are made of thermoplastic resin and formed in injection molding. The lateral covers 101L, 101R are formed to have handgrips 101H (solely one on the left is shown in FIG. 1), which allow the user to grip onto when the image forming apparatus 1 is uplifted, at lower lateral edges thereof.

The main housing 101 further includes a scanner top cover 111, a scanner base 112, an operation panel 113, a joint cover top 121, and a joint cover base 122 (see FIGS. 2-4), which are made of thermoplastic resin and formed in injection molding. External surfaces of the scanner top cover 111, the scanner base 112, the operation panel 113, the joint cover top 121, and the joint cover base 122 are at least partially covered with the front cover 101A, the lateral covers 101L, 101R, and the rear cover 101B. Meanwhile, a front face of the operation panel 113 and a part of a front face of the joint cover top 121 form external coverings of the main housing 101.

The scanner top cover 111 serves as a frame to hold the platen glass 21 and is arranged in a top section in the main housing 101.

The scanner base 112 is formed to have a shape of a tray, which supports the image reader 22 and the slider mechanism from below, and is connected to a lower plane of the scanner top cover 111. A front section of a bottom of the scanner base 112 serves as the ceiling section of the ejecting space 30. The scanner base 112 is formed to be greater in depth than the scanner top cover 111; therefore, the bottom of the scanner base 112 protrudes frontward to be longer than the scanner top cover 111. In the present embodiment, the frontward-protruding section of the bottom is referred to as a front bottom section 114. In other words, the front bottom section 114 is formed integrally with the scanner base 112, and a front end thereof coincides with the upper edge 31A of the pickup opening 31.

Figure 3:
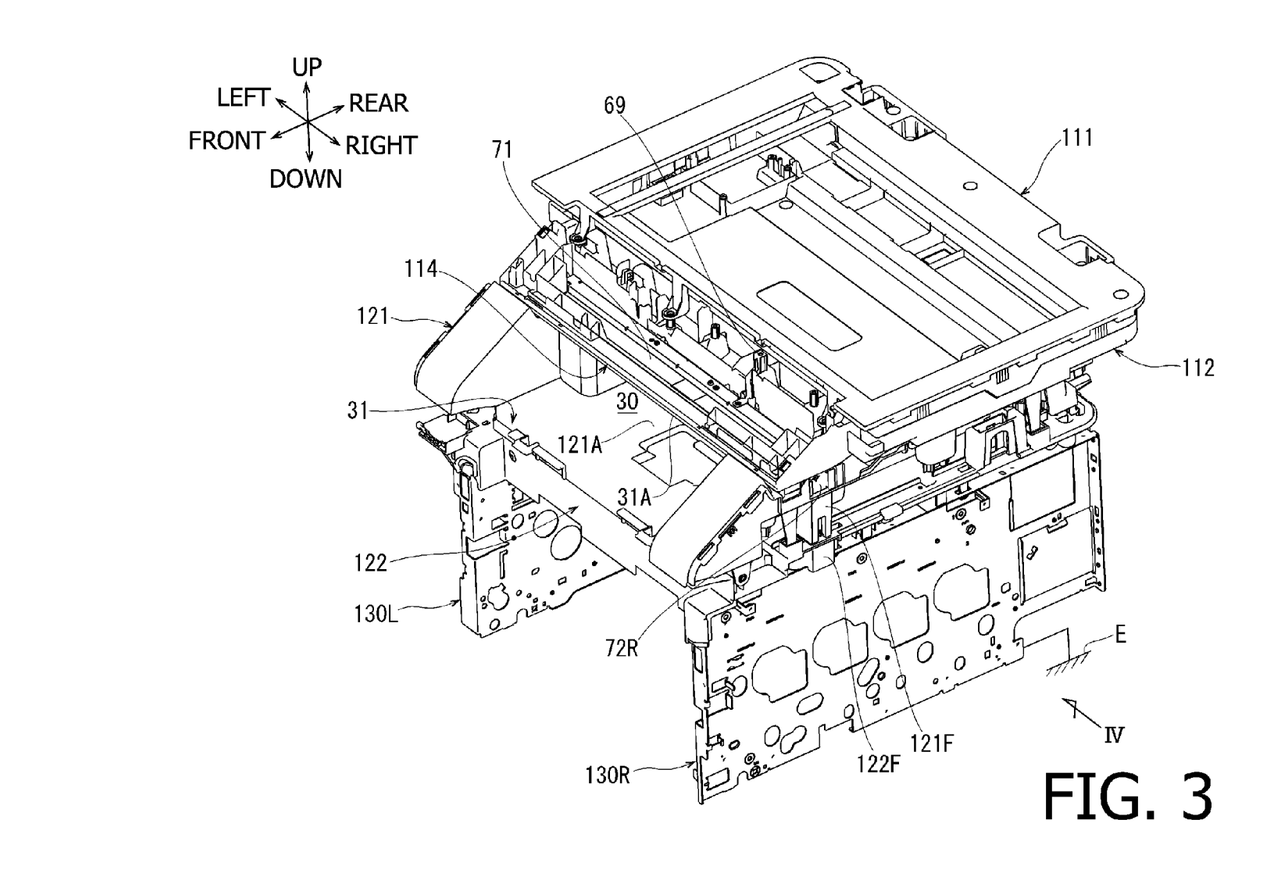
FIG. 3 is a perspective view of a frame assembly in the image forming apparatus, including a scanner top cover, a scanner base, a joint cover top, a joint cover base, a pair of lateral frames, and enhancement members, according to the embodiment of the present invention.
Figure 4:
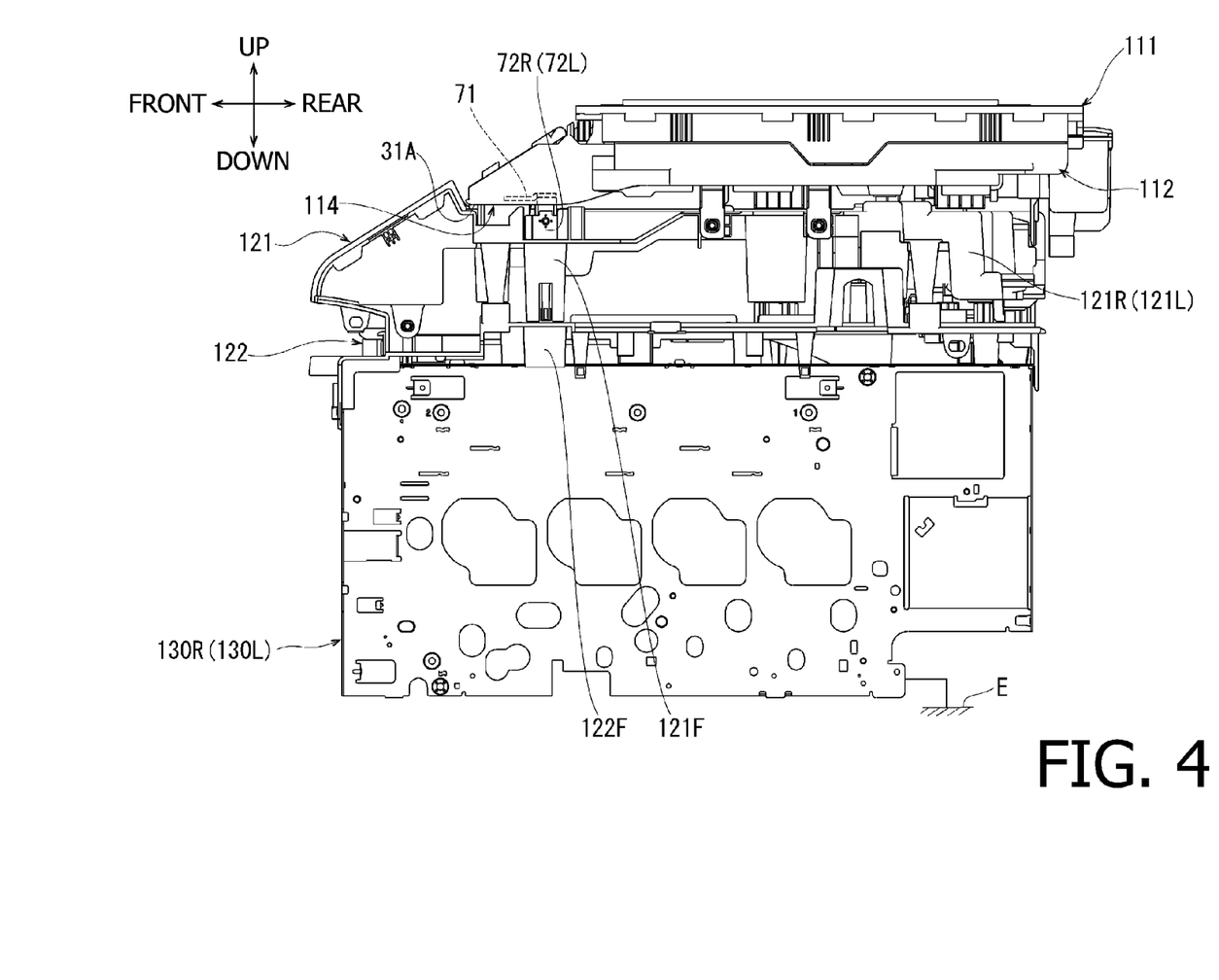
FIG. 4 is a side view of the image forming apparatus according to the embodiment of the present invention, viewed along a direction IV shown in FIG. 3.

The operation panel 113 is connected to a front edge of the scanner top cover 111 at an upper edge thereof and to the front end of the front bottom section 114 of the scanner base 112 at a lower edge thereof. As the front bottom section 114 protrudes frontward with respect to the front edge of the scanner top cover 111, the operation panel 113 is arranged in an inclined posture, with the upper edge being nearer to the rear and the lower edge being further from the rear, to cover the front bottom section 114 from above. On the operation panel 113, the components in the operation unit 50 such as the keys 62 and the display 63 are fixed. Thus, the operation panel 113 and the front bottom section 114 form the exterior surfaces of the operation panel 50. As seen in FIG. 3, in which the scanner top cover 111 and the scanner base 112 without the operation panel 113 are shown, a space ranging in the widthwise direction to store the electric circuit board 61 is reserved in a position between the operation panel 113 and the front bottom section 114.

Figure 5:
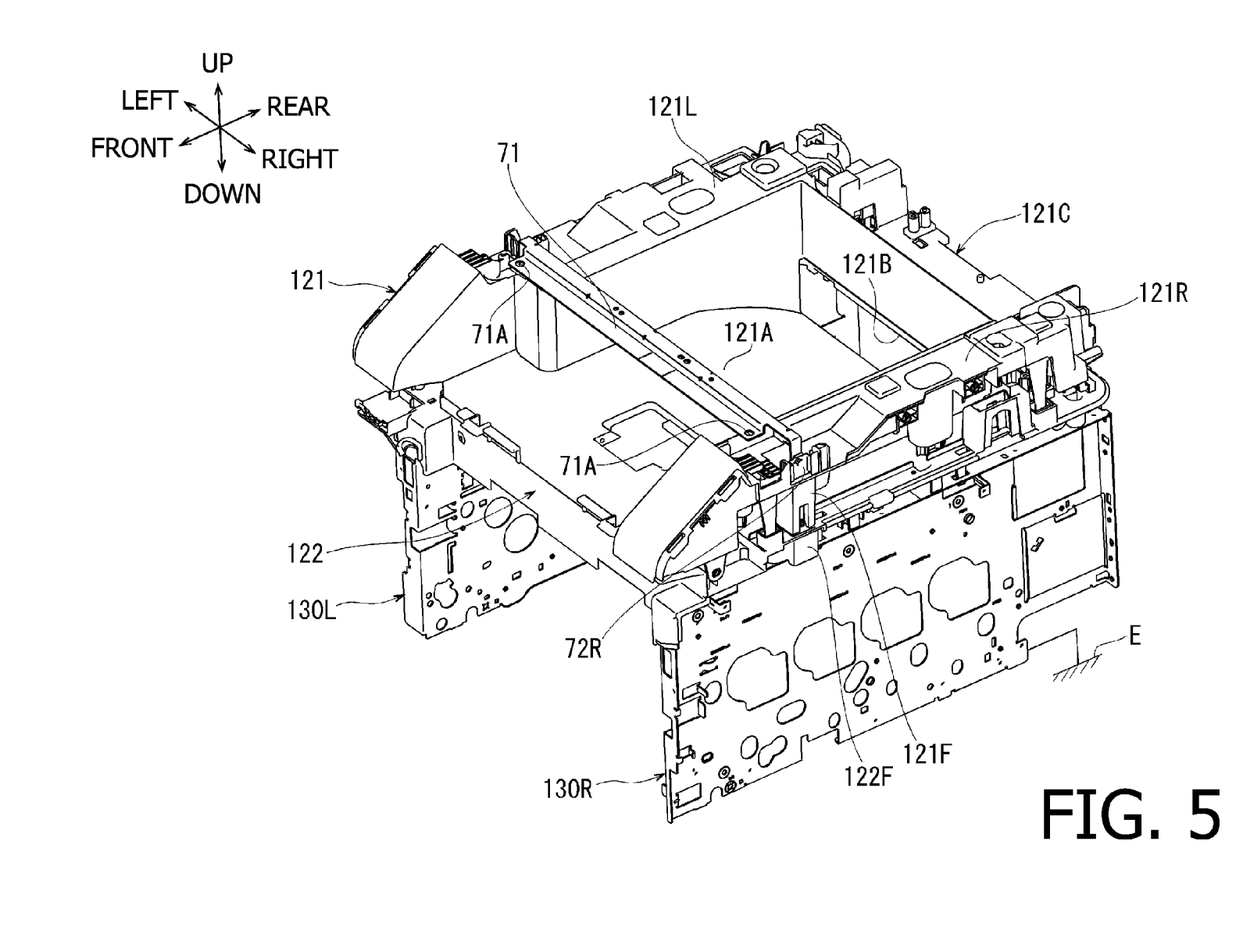
FIG. 5 is a perspective view of a part of the frame assembly of the image forming apparatus, including the joint cover top, the joint cover base, the pair of lateral frames, and the enhancement members, according to the embodiment of the present invention.

The joint cover top 121 includes a tray section 121A, lateral walls 121L, 121R, and a rear wall 121C, which are integrally formed (see FIG. 5). The lateral walls 121L, 121R are arranged on lateral ends of the tray section 121A to face each other and interpose the tray section 121A in there-between. The rear wall 121C connects the lateral walls 121L, 121R with each other, and an outlet 121B is formed in a position vertically intermediate between the rear wall 121C and a rear end of the tray section 121A. When upper edges of the lateral walls 121L, 121R are connected to the bottom of the scanner base 112, the ejecting space 30 and the pickup opening 31 are created in the position between the scanner base 112 and the joint cover top 121 (see FIGS. 2-4).

Figure 6:
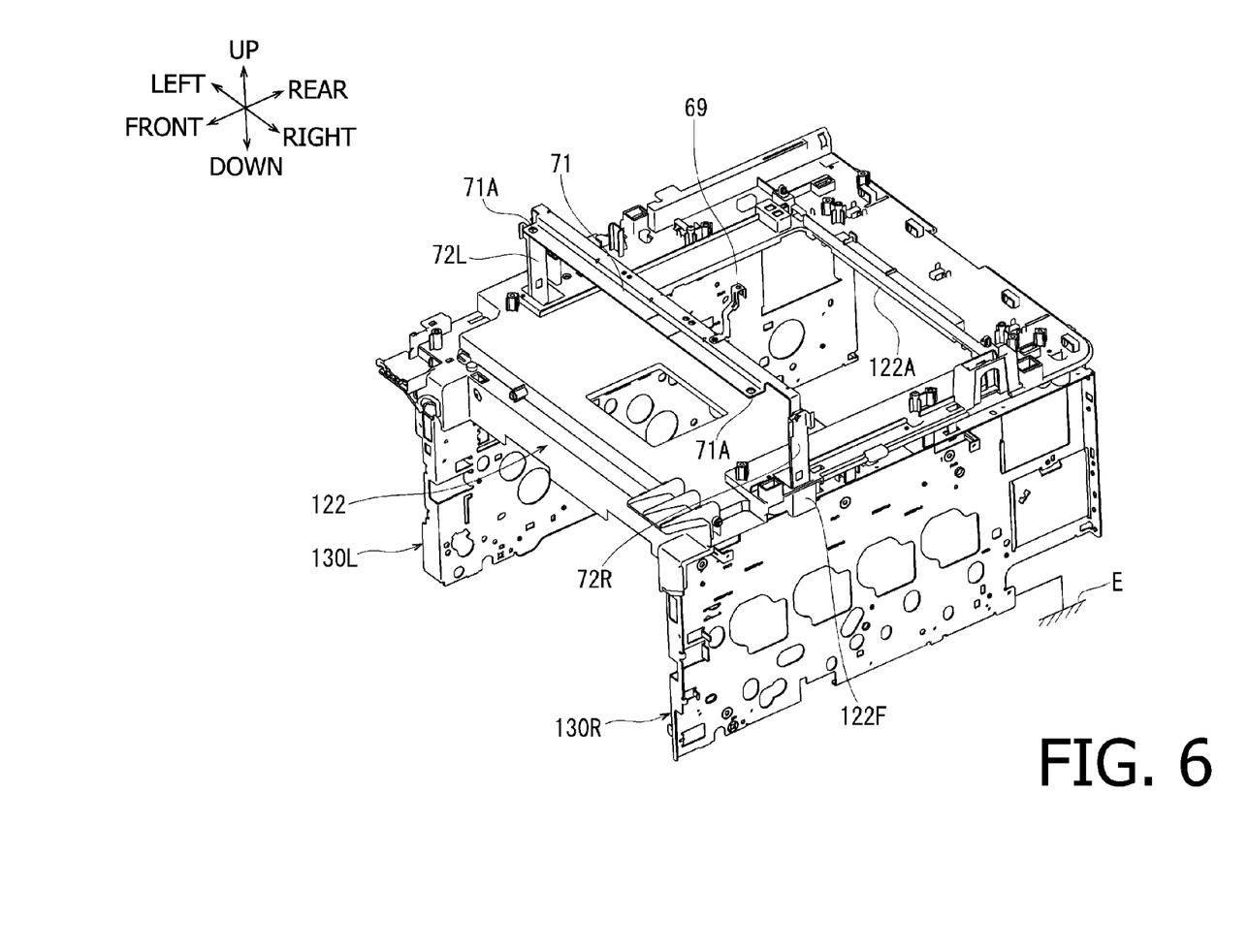
FIG. 6 is a perspective view of a part of the frame assembly of the image forming apparatus, including the joint cover base, the pair of lateral frames, and the enhancement members, according to the embodiment of the present invention.

The joint cover base 122 is a flat plate having a four-sided opening 122A formed in a central area thereof (see FIGS. 2, 4, and 6) and connected to the bottom of the joint cover top 121. The joint cover base 122 enhances the joint cover top 121 and connects lateral frames 130L, 130R, which are arranged in a lower section inside the main housing 101, at upper edges.

When the recording medium 9 conveyed in the conveyer path P1 is ejected through the opening 122A and the outlet 121B to be settled on an upper plane of the tray section 121A.

Lateral Frames

The lateral frames 130L, 130R are formed to have shapes of flat plates and arranged inside the main housing 101 to face each other (see FIGS. 2-7). The image printer unit 10 is interposed between the lateral frames 130L, 130R. The lateral frames 130L, 130R are arranged to be in parallel with each other along the directions of depth and height to range from the front end to the rear end of the main housing 101. The lateral frames 130L, 130R are attached to lateral planes of the image printer unit 10 to hold the image printer unit 10 from right and left.

In FIGS. 3-7, the image of the image printer unit 10 in the position between the lateral frames 130L, 130R is omitted. The sheet cassette 11 and the image forming unit 13 are removably installed in the predetermined positions in the main housing 101. When removed, the sheet cassette 11 and the image forming unit 13 are pulled frontward with respect to the lateral frames 130L, 130R out of the main housing 101. According to the present embodiment, in order to support the image printer unit 10 and other components with substantial weight, and to maintain the image printer unit 10 in a correct position while accurate positioning of the image printer unit 10 in the image forming apparatus 1 is required, the lateral frames 130L, 130R are made of steel with rigidity.

The lateral frames 130L, 130R, the scanner top cover 111, the scanner base 112, the joint cover top 121, and the joint cover base 122 are connected with one another to compose a frame assembly of the image forming apparatus 1. In this regard, the scanner top cover 111, the scanner base 112, the joint cover top 121, and the joint cover base 122 serve as parts of the main housing 101 and parts of the frame assembly at the same time. The frame assembly may include additional components other than the components described above; however, description of those is herein omitted.

The lateral frame 130L is arranged in a leftward position with respect to the ejecting space 30, while the lateral frame 130R is arranged in a rightward position with respect to the ejecting space 30 (see FIG. 3). The lateral frame 130R is connected with a grounding terminal E at a rear end portion. The lateral frame 130R made of steel with conductivity connects electrically the electrical components in the image printer unit 10, the image reader unit 20 and the electric circuit board 61 to the grounding terminal E to ground.

Enhancement Member

In the operation unit 50, a first enhancement member 71 is arranged on an upper plane of the front bottom section 114 (see FIGS. 2 and 3). The first enhancement member 71 is formed to have a shape of an elongated flat bar (see FIGS. 7 and 8), which is made of, for example, punch-pressed steel. The first enhancement member 71 is arranged to extend in the widthwise direction and bridge over the ejecting space 30. Right and left ends of the first enhance member 71 are bent downwardly.

The first enhancement member 71 is formed to protrude frontward at a center portion to be larger than the right and left end portions thereof, and the protruded front end is closer to the upper edge 31A of the pickup opening 31. The protruded center portion is crank-bent to have a shape of steps in a cross-sectional view. The shape of steps can prevent the first enhancement member 71 from being deformed upwardly when uplifting force is applied to the center portion of the first enhancement member 71.

Figure 7:
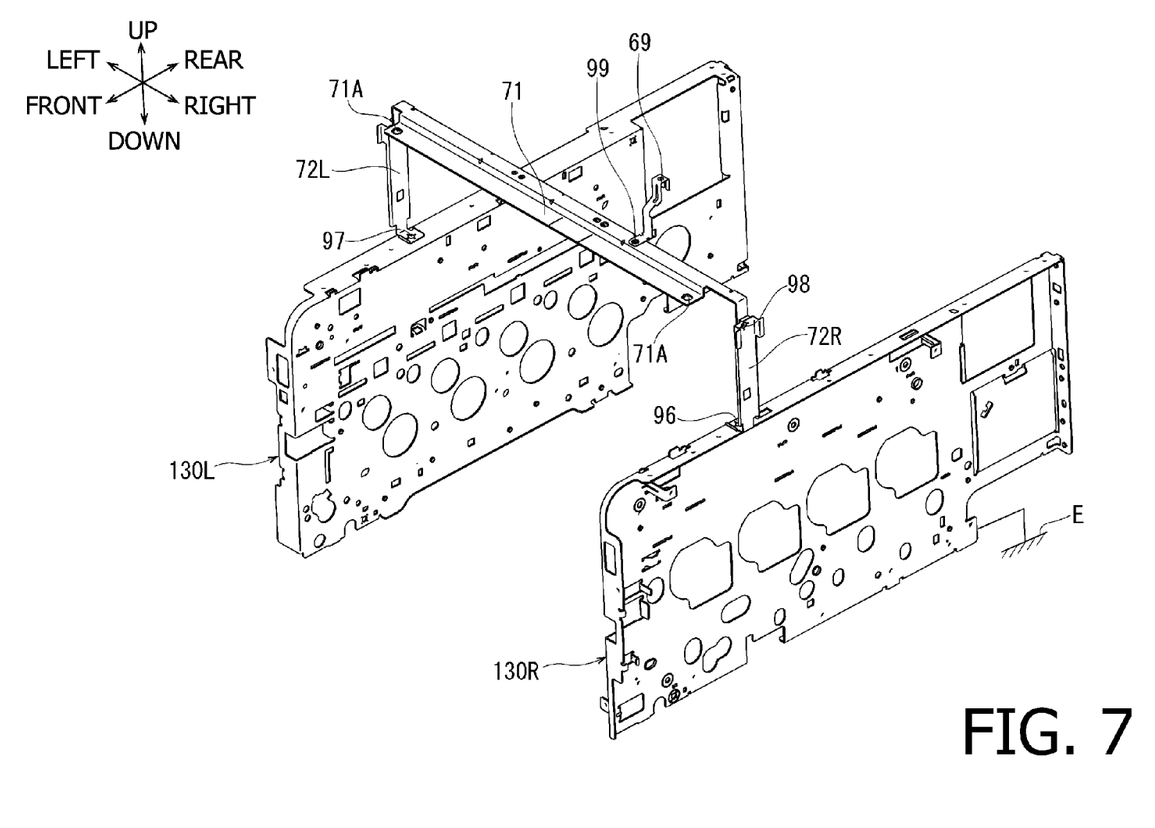
FIG. 7 is a perspective view of a part of the frame assembly of the image forming apparatus, including the pair of lateral frames and the enhancement members, according to the embodiment of the present invention.
Figure 8:
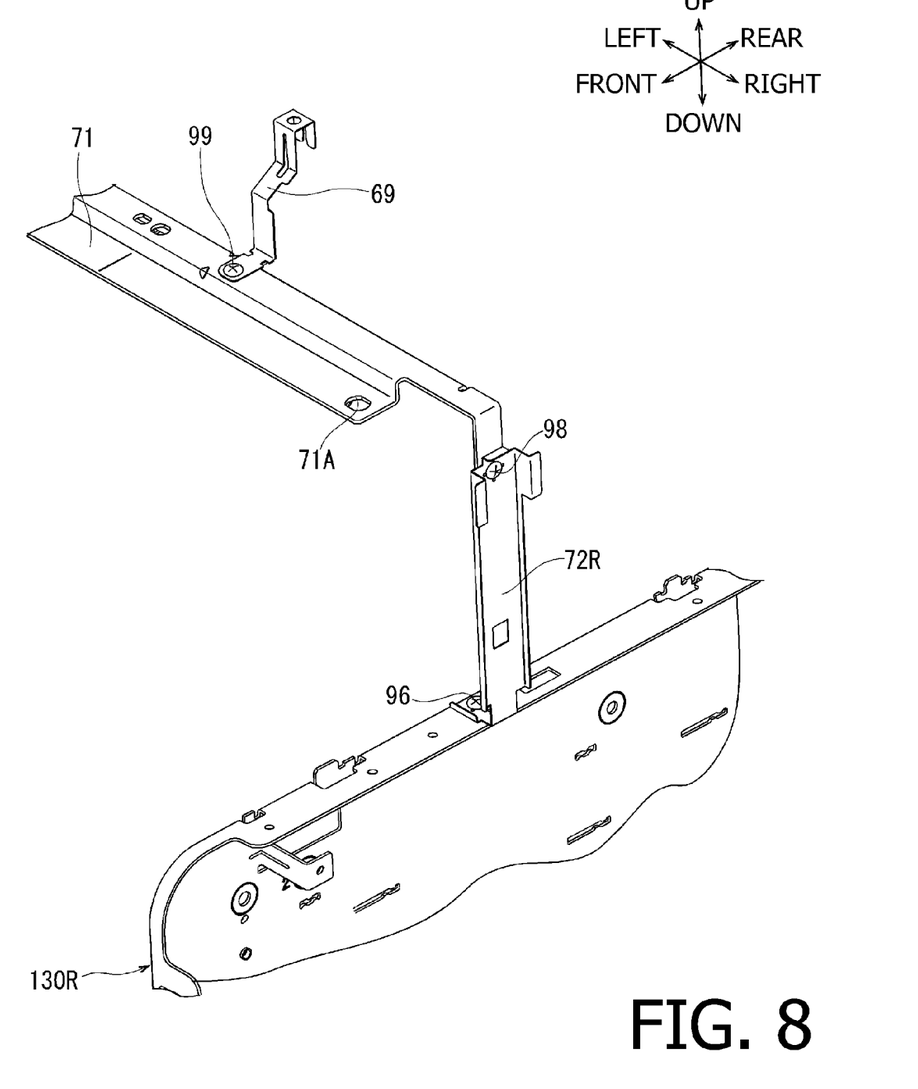
FIG. 8 is an enlarged view of the enhancement members and a part of the lateral frame in the image forming apparatus according to the embodiment of the present invention.

On right and left corners of the protruded center portion of the first enhancement member 71, a pair of openings 71A are formed (see FIGS. 7 and 8). Screws (not shown) to fix the first enhancement member 71 on top of the front bottom section 114 are inserted through the openings 71A and screwed into the front bottom section 114.

Meanwhile, the electric circuit board 61 is arranged in a position between the first enhancement member 71 and the operation panel 113 (see FIG. 2). The electric circuit board 61 is held in the position on the front bottom section 114 via ribs and bosses (not shown), which protrude upwardly from the upper plane of the front bottom section 114. The ribs and the bosses have substantial height to maintain clearance between the electric circuit board 61 and the upper plane of the front bottom section 114. In a widthwise center position of the first enhancement member 71, a connector piece 69 (see FIG. 8) is connected at a lower end thereof to the first enhance member 71 via a screw 99. The connector piece 69 is made of steel and arranged in an angled shape, which is bent at a plurality of sections, to extend upwardly from the first enhance member 71. An upper end of the connector piece 69 is electrically connected to the electric circuit board 61; therefore, the connector piece 69 connects the electric circuit board 61 to the grounding terminal E to ground.

The first enhance member 71 is connected with a second enhancement member 72L and a second enhancement member 72R at the left and right side ends thereof respectively (see FIGS. 7 and 8). More specifically, the downwardly-bent portion at the left-side end of the first enhancement member 71 is connected with an upper end portion of the second enhancement member 72L via a screw (not shown). Similarly, the downward bent portion at the right-side end of the first enhancement member 71 is connected with an upper end portion of the second enhancement member 72R via a screw 98.

The second enhancement members 72L, 72R are made of, for example, punch-pressed steel and formed to have shapes of elongated rectangle with longer sides extending in parallel with the direction of height. The second enhancement member 72L is connected to an upper edge of the lateral frame 130L to be supported at a lower end portion thereof via a screw 97 (see FIG. 7). The second enhancement member 72R is connected to an upper edge of the lateral frame 130R to be supported at a lower end portion thereof via a screw 96 (see FIGS. 7 and 8).

In order to allow the second enhancement members 72L, 72R to extend downwardly to reach the upper edges of the lateral frames 130L, 130R without being interfered with by the joint cover top 121 and the joint cover base 122, the joint cover top 121 and the joint cover base 122 are formed to have pass-through sections 121F, 122F (see FIGS. 3-6), which are vertically extending channels to allow the second enhancement members 72L, 72R to pass there-through. When the joint cover top 121 and the joint cover base 122 are coupled to each other, the pass-through sections 121, 122F become communicated with each other, and the second enhancement members 72L, 72R are inserted in the pass-through sections 121F, 122F to connect the first enhance member 71 with the lateral frames 130L, 130R.

Effects

When the image forming apparatus 1 is uplifted to be carried by the user, it is assumed that the user should grip onto the handgrips 101H. However, it is also assumed that the user might grip onto the front bottom section 114, which is in the vicinity of the operation unit 50 and is a part of the upper edge 31A of the pickup opening 31. In so doing, upward uplifting force F (see FIG. 2) to uplift the image forming apparatus 10 with the substantial weight may be undesirably applied to the front bottom section 114. However, when the first enhancement member 71, which extends in the widthwise direction along the upper edge 31A of the pickup opening 31 and bridges over the ejecting space 30, and the second enhancement members 72L, 72R are arranged in the position below the electric circuit board 61 in the operation unit 50, the uplifting force F is mostly transmitted to the first enhancement member 71 and the second enhancement members 72L, 72R. Further, while the second enhancement members 72L, 72R are connected to the lateral frames 130L, 130R with rigidity, the transmitted uplifting force F is distributed in the entire frame assembly. Therefore, force to be directly applied to the operation unit 50 is reduced, and the operation unit 50 is prevented from being affected by the uplifting force F. Accordingly, the electric circuit board 61 in the operation unit 50, including the electrical components and the wires, can be prevented from being deformed or damaged. In other words, factors to cause damages in the image forming apparatus 1 can be reduced.

The first enhancement member 71 is fixed to the upper plane of the front bottom section 114, which is integrally formed with the scanner base 112 and forms the upper edge 31A of the pickup opening 31, and the electric circuit board 61 is arranged in the position between the first enhancement member 71 and the operation panel 113. With the configuration and the arrangement, rigidity of the operation unit 50 can be improved even more effectively. Further, when the position of the first enhancement member 71, along with the second enhancement members 72L, 72R, on the front bottom section 114 is determined in consideration of the position of the electric circuit board 61 in the operation unit 50, deformation of the electric circuit board 61 in the operation unit 50 can be more effectively prevented. In other words, the enhancement members 71, 72L, 72R can be arranged in a more advantageous position to effectively prevent the deformation by considering the position of the electric circuit board 61 in the operation unit 50. Therefore, factors to cause damages in the image forming apparatus 1 can be effectively reduced.

As mentioned above, the first enhancement member 71 and the second enhancement members 72L, 72R are made of conductive steel and serve as grounding links, along with the steel-made lateral frames 130R and the connector piece 69, to ground the electric circuit board 61. Therefore, a specific grounding wire to connect the lateral frames 130R with the connector piece 63 can be omitted, and a quantity of components to compose the image forming apparatus 1 can be reduced.

Although an example of carrying out the invention has been described, those skilled in the art will appreciate that there are numerous variations and permutations of the image forming apparatus that falls within the spirit and scope of the invention as set forth in the appended claims. It is to be understood that the subject matter defined in the appended claims is not necessarily limited to the specific features or act described above. Rather, the specific features and acts described above are disclosed as example forms of implementing the claims.

For example, the lateral walls 121L, 121R of the joint cover top 121 may support the second enhancement members 72L, 72R in place of the lateral frames 130L, 103R. Additionally or alternatively, the left and right downward ends of the first enhancement member 71 may be directly connected to the lateral frames 130L, 130R or the lateral walls 121L, 121R, and the second enhancement members 72L, 72R may be omitted.

For another example, the positions of the unit components to be stored in the main housing 101 the image forming apparatus 1, including the image printer unit 10, the image reader unit 20, and the ejecting space 30, may not necessarily be those as described in the above embodiment. In other words, the image printer unit 10 may not necessarily be arranged in the lower position with respect to the image reader unit 20, or the ejecting space 30 may not necessarily be formed in the position between the image reader unit 20 and the image printer unit 10 as long as the section below the electric circuit board 61 is enhanced by the enhancement members, 71, 72L, 72R.

The present invention may be applied to, for example, a multicolor or a monochrome image forming apparatus including a multifunction peripheral device.

What is claimed is:

1. An image forming apparatus, comprising:
a housing, which is configured to form an external shape of the image forming apparatus;
an image forming unit, which is stored inside the housing and configured to form an image on a recording medium;
an image reader unit, which is stored inside the housing with respect to the image forming unit and configured to read an image formed on an original document;
an ejecting space, which is formed in the housing and configured to catch the recording medium, with the image formed thereon, being ejected;
a pickup opening, which is formed on a side of the housing to expose the ejecting space, and through which the recording medium caught in the ejecting space is picked up; and
a frame assembly, which is arranged inside the housing and configured to hold the image forming unit and the image reader unit,
wherein the housing comprises an operation unit, which is arranged in an upper position with respect to the ejecting space and configured to form an upper edge of the pickup opening, and through which input information concerning behaviors of the image forming unit and the image reader unit is entered, the operation unit including an electric circuit board;
wherein an enhancement member, which extends along a widthwise direction to bridge over the ejecting space, is arranged in a lower position in the operation unit with respect to the electric circuit board, the widthwise direction being in parallel with the upper edge;
wherein the frame assembly comprises a first support member, which is arranged in one of widthwise ends of the ejecting space, and a second support member, which is arranged in the other of widthwise ends of the ejecting space; and
wherein one of widthwise ends of the enhancement member is connected to the first support member, and the other of the widthwise ends of the enhancement member is connected to the second support member.

2. The image forming apparatus according to claim 1,
wherein the image forming unit is stored in a lower position with respect to the image reader unit, and the image reader unit is stored in an upper position with respect to the image forming unit; and
wherein the ejecting space is formed in a position between the image forming unit and the image reader unit.

3. The image forming apparatus according to claim 1,
wherein the image reader unit comprises a flatbed surface, on which the original document to be read is placed, and an image reader, which is configured to read the image on the original document while being moved in a readable range underneath the flatbed surface;
wherein the housing comprises a base member, which is configured to support the flatbed surface and the image reader from below;
wherein the operation unit includes a bottom section, which is formed integrally with the base member and forms the upper edge of the pickup opening, and an operation panel, which is arranged in an upper position with respect to the bottom section and is provided with keys;
wherein the enhancement member is fixed to an upper plane of the bottom section; and
wherein the electric circuit board is arranged in a position between the enhancement member and the operation panel.

4. The image forming apparatus according to claim 1,
wherein the enhancement member is made of a conductive metal and serves as a part of a grounding link, which connects a grounding terminal arranged on the frame assembly and the electric circuit board.

5. The image forming apparatus according to claim 1,
wherein the frame assembly comprises a pair of lateral frames, which are configured to support the image forming unit interposed therebetween;
wherein the first support member is one of the pair of lateral frames, which is arranged in one of the widthwise ends of the ejecting space; and
wherein the second support member is the other of the pair of lateral frames, which is arranged in the other of the widthwise ends of the ejecting space.

* * * * *